The operating principles of the pump-flowmeter illustrated in FIGS. 2 and 3 are straightforward. The flap assembly opens up when it rotates by the second fluid passage 20 and closes down when it rotates by the fluid passage 18. The flap assembly rotating in the clockwise direction takes in fluid through the fluid passage 20 and expells the fluid through the fluid passage 18. The fluid flowing through pump-flowmeter from the fluid passage 18 to the fluid passage 20 rotates the flap assembly in the counter-clockwise direction at a speed substantially proportional to the volume rate of the fluid flow. Although the preferred direction of rotation of the flap assembly shown in FIG. 2 as a pump is the clockwise direction, the counter-clockwise rotation thereof also generates a pumping action as the centrifugal force of the individual flaps open up the flap assembly as it rotates by the fluid passage 18, while the wall of the cylindrical cavity closes down the flap assembly as it rotates by the fluid passage 20. Consequently, in this mode of operation as a pump, the flap assembly rotating in the counter-clockwise direction pumps fluid from the fluid passage 18 to the fluid passage 20. It should be understood that the first and second fluid passages 18 and 20 must be separated from one another by two diametrically oppositely located solid portions of the cylindrical wall of the cylindrical cavity 15 wherein the circumferential width of the solid portions of the cylindrical wall is wide enough whereby at least one flap is under a sliding contact with each of the two solid portions of the cylindrical wall at all instances and thus provides a pressure barrier intermediate the first fluid passage 18 and the second fluid passage 20. The pump-flowmeter shown in FIGS. 2 and 3 has fluid passages disposed through the cylindrical wall of the cylindrical cavity and, consequently, it is called a side-port pump-flowmeter.

In FIG. 4 there is shown an end view of a pump-flowmeter with fluid passages disposed through the end wall of the cylindrical cavity. Consequently, this type of pump-flowmeter is called an end-port pump-flowmeter. The end-port pump-flowmeter comprises a flap assembly 32 eccentrically disposed within a cylindrical cavity 33 in the same arrangement as that described in conjunction with FIGS. 1 and 2. The first fluid passage 34 is disposed through an end wall 35 in the first half side divided by a plane simultaneously including the central axis 36 of the flap assembly and the central axis 37 of the cylindrical cavity 33. The second fluid passage 38 is disposed through the end wall 35 of the cylindrical cavity 33. The first and second fluid passages 34 and 38 are shaped in such a way that the two flow passages are separated by at least one flap under sliding contact with the end wall 35 at all instances, while the two flow passages are provided with the maximum opening area.

In FIG. 5 there is illustrates a cross section of the end-port pump-flowmeter shown in FIG. 4, which cross section is taken along plane 5—5 as shown in FIG. 4. One of the two flanges 39 and 40 supporting the journals pivotably engaged by the flaps, that is disposed adjacent to the end wall 41 including the two fluid passages 34 and 38, has a reduced diameter to provide a sufficient unobstructed area for the end wall 41, through which the two fluid passages are disposed. The two fluid passages 34 and 38 are respectively open to the first port 42 and second port 43. It is clear that, instead of disposing both of the two fluid ports through one end wall 41 of the cylindrical cavity 33 as shown in the particular embodiment of FIGS. 4 and 5, the first fluid passage is disposed through the first end wall while the second fluid passage is disposed through the second end wall opposite to the first end wall, which arrangement is particularly advantageous for the construction of a multi-stage pump comprising two or more pumps arranged in series in an end-to-end configuration and driven by a common shaft. It should be mentioned that the journals pivotably supporting the flaps may be secured to one flange instead of the two flanges as illustrated in FIG. 8.

In FIG. 6 there is illustrated a few different matters of design employed in the construction of flaps. The flap 44 has a solid construction. The flap 45 has a hollow construction wherein the journal bearing hole 46 is connected to the structure of the crescent tear drop shape by a plurality of webs. The flap 47 has a solid construction wherein the central portion of the end faces thereof is recessed. The flap 48 has a solid round first edge and a hollow crescent second edge wherein the mass distribution is balanced about the pivoting axis 49 of the flap. The flap 50 has a magnet 51 imbedded in the crescent tip of the flap, which enhances a sliding contact thereof with the wall of the cylindrical cavity even when the rotating speed of the flap assembly is very low. The flap 52 has a rounded tip of the crescent second edge, which provides improved wear characteristics for the flap.

In FIG. 7 there is illustrated Yin-Yang laps with rounded edge 53 and ball corner 54 wherein a common radius is employed for the rounded edge 53 and the ball corner 54.

In FIG. 8 there is illustrated a cross section of a pump-flowmeter comprising flaps with rounded edges and ball corners as shown in FIG. 7. The corners 55 and 56 of the cylindrical cavity 57 are rounded to match the rounded edges and ball corners of the flap. In this particular embodiment, the journals pivotably holding the flaps are rigidly extending from a single flange 58 affixed to the shaft 59, which arrangement provides an unobstructed end wall 60 and allow flexibility for disposing the two end-ports 61 and 62.

In FIG. 9 there is illustrated a few examples of modified flaps. The flap 63 includes a planar seal 64 snapped into a seal groove included in the two end faces and the side surface of the flap. The tip 65 of the planar seal 64 is supported by an enlarged tip 66 of the crescent second edge of the flap. The round first edge of the adjacent flap includes a recession to accomodate the combination of the enlarged tip 66 and the tip 65 of the planar seal 64. The flap 67 has a thickened tip 68 of the crescent second edge thereof, that provides improved strength and wear characteristics for the flap. Of course, the first round edge of the adjacent Yin-Yang blade has a recess to accomodate the thickened tip 68 of the flap. The flap 69 includes a reinforced tip 70 of the crescent second edge wherein the tip 70 is reinforced in the form of a round bar. The round first edge of the adjacent blade includes a recess accomodating the reinforced edge 70 of the flap. The flap 71 has a roller bar 72 rotatably retained in a retaining groove disposed in the enlarged tip of the crescent second edge of the flap. Of course, the round first edge of the adjacent flap must have a recess to accomodate the tip of the flap with the roller 72. There is a discontinuity or imperfection in the outer perimeter of the flap assembly, which discontinuity or imperfection extends over a circumference $\alpha$, because of the modified tip of the crescent edge of the flap and the recess included in the round edge of the adjacent

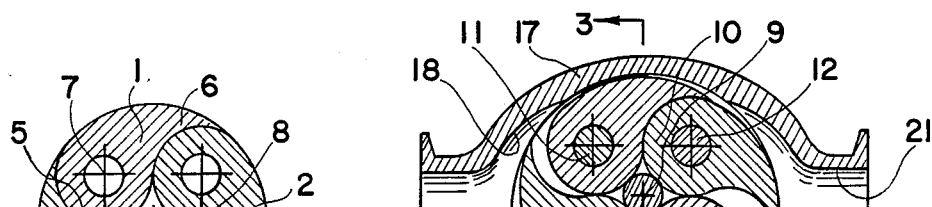

PIVOTING FLAP PUMP-FLOWMETER

BACKGROUND OF THE INVENTION

This patent application is a Continuation-In-Part application to patent application Ser. No. 730,853 entitled "Flap Pump Flowmeter", which was filed on May 6, 1985, that is now U.S. Pat. No. 4,646,586.

Many different types of positive displacement fluid handling devices such as pumps, compressors, flowmeters, etc. are used very widely in todays industries. With few exceptions, all of the existing positive displacement fluid handling devices employ reciprocating motions in the kinematics of operation thereof and, consequently, all of these existing devices suffer from poor efficiency arising from the sliding friction between parts and pulsating inertia forces associated with the reciprocating movements. It has been proven over and over in the history of the industries that the transition from reciprocating principles to rotating principles in the design of machines has been the symbol of progress. In spite of the wide spread use of the positive displacement fluid handling devices in todays industry, none of the existing positive displacement fluid handling devices exclusively use the rotating principles. This implies that there is room for an imminent progress and drastic advance in the technology of positive displacement fluid handling devices.

SUMMARY OF THE INVENTION

The primary object of the present invention is to provide a positive displacement pump-flowmeter operating on one hundred percent rotating motion.

Another object is to provide a positive displacement pump-flowmeter providing high volume flow capacity at low to medium pressure head.

A further object is to provide a positive displacement pump-flowmeter having the minimum sliding frictions.

Yet another object is to provide a positive displacement pump-flowmeter comprising a plurality of flaps with round first edge and crescent second edge (crescent tear-dropshape) arranged in a rotationally symmetric arrangement wherein the round first edges of the flaps disposed adjacent to the central axis of the flap assembly are closely spaced therebetween.

Yet a further object is to provide the flap assembly wherein each of the flaps is pivotable about the center line of the radius of the round first edge thereof and rotates with the flap assembly about the central axis of the flap assembly.

Still another object is to provide the flap assembly wherein the outer perimeter of the flap assembly becomes a substantially circular cylindrical surface when all of the flaps are fully folded in.

Still a further object is to provide a positive displacement pump-flowmeter comprising the flap assembly rotatably disposed within a cylindrical cavity in an eccentric arrangement wherein the cylindrical cavity includes at least one fluid inlet and at least one fluid outlet.

Additionally another object is to provide a pump-flowmeter including means for limiting the sliding contact between the tips of the crescent second edges of the flaps and the internal cylindrical surface of the cylindrical cavity housing the flap assembly.

Additionally a further object is to provide a pump-flowmeter including a rotating shell rotatably disposed in the cylindrical cavity and enveloping the flap assembly.

These and other objects of the present invention will become clear as the description thereof proceeds.

BRIEF DESCRIPTION OF FIGURES

The present invention may be described with a great clarity and specificity by referring to the following figures :

FIG. 1 illustrates a cross section of an embodiment of a typical flap assembly.

FIG. 2 illustrates an embodiment of the pump-flowmeter with inlet and outlet ports disposed through the cylindrical side thereof.

FIG. 3 illustrates a cross section of the pump-flowmeter shown in FIG. 2.

FIG. 4 illustrates another embodiment of the pump-flowmeter with inlet and outlet ports disposed through the end plate thereof.

FIG. 5 illustrates a cross section of the pump-flowmeter shown in FIG. 4.

FIG. 6 illustrates a few different design for the individual blades as well as for the flaps assembly.

FIG. 7 illustrates a flaps assembly comprising the individual flaps with rounded edges.

FIG. 8 illustrates a cross section of a pump-flowmeter employing flaps with rounded edges as shown in FIG. 7.

DESCRIPTION OF THE ILLUSTRATED EMBODIMENTS

Figure 9:
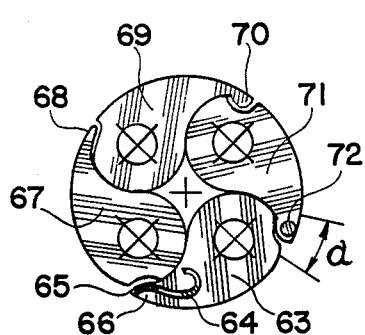
FIG. 9 illustrates a few different modifications of the standard flap.

In FIG. 1 there is illustrated a cross section of a typical flap assembly comprising a plurality of crescent tear drop shaped flaps 1, 2, 3, 4, etc. The cross section of each of the flaps has a round first edge 5 and a crescent second edge 6, and a journal bearing hole 7 concentric to the center of the radius of the round first edge thereof, which journal bearing hole may be a through hole or two blind holes disposed in the two end faces of the flap. The plurality of flaps are assembled into a flap assembly wherein the round first edges are disposed adjacent to and about the central axis 8 of the flap assembly in a rotationally symmetric pattern wherein the round first edges of the flaps are disposed in a close tolerance therebetween. This flap assembly is held together by a plurality of journals respectively engaging the journal bearing holes included in the flaps, whereby, each of the flaps is pivotable about an axis coinciding with the center of radius of the round first edge thereof. When the plurality of the flaps are fully folded in, the outer perimeter of the flaps substantially coincides with a circular cylindrical surface with center at the center of the flap assembly.

Although the cross section of the individual flap and the assembly thereof shown in FIG. 1 shows a preferred geometry of typical flaps and the assembly thereof, there can be three major modifications which can be incorporated into the basic geometries shown in FIG. 1 without compromising the operating principles of the pump-flowmeter. Firstly, the round first edges of the adjacent flaps need not be in contact or near-contact to one another when a seal shutting off the fluid passage between the round first edges of the adjacent flaps is included as illustrated by an embodiment shown in FIG. 6. Secondly, the round first edge of the flap need not be a continuous circular cylindrical surface. As long as the portion or portions of the round first edge of the flap, which portion or portions provide a seal or fluid barrier in conjunction with corresponding portion of the round first edge of an adjacent flap as shown in FIG. 1 or in conjunction with a seal as shown in FIG. 6, are of a circulary cylindrical surface, the round first edge of the flap can include crevices or indentations as illustrates by embodiments shown in FIG. 9. Thirdly, the outer perimeter of the flap assembly with all flaps folded in need not be a circular cylindrical surface of continuous or near-continuous geometry. As long as a substantial portion of the flap coinciding with a circular cylindrical surface including the outer perimeter of the flap assembly shown in FIG. 1, is of circular cylindrical surface, that portion of the surface of the flap or the junctures in the outer perimeter of the flap assembly between two adjacent flaps may include crevices as illustrated by the embodiments shown in FIGS. 7 and 9. It should be understood that the number of flaps included in one flap assembly may vary from two to any larger numbers depending upon the preference in design and requirement in operation.

In FIG. 2 there is illustrated a cross section of an embodiment of the pump-flowmeter constructed in accordance with the principles of the present invention, which cross section is taken along a plane perpendicular to the central axis 9 of the flap assembly 10. The flaps included in the flap assembly 10 are pivotably supported by a plurality of journals 11, 12, 13, 14, etc. respectively. The flap assembly 10 with the central axis 9 is rotatably disposed within a cylindrical cavity 15 with the central axis 16 in parallel and eccentric relationship wherein the eccentric arrangement is such that the minimum distance from the central axis 9 of the flap assembly to the wall of the cylindrical cavity 15 is generally equal to the radius of a circular cylindrical surface including the pheripheral surface of the flap assembly when the flap assembly is folded into a generally circular cross section, while the maximum distance therebetween is less than the sum of the distance between the central axis of the flap assembly 9 and the pivoting axis of the individual flap and the distance between the pivoting axis of the individual flap to the crescent edge thereof. The cross section of the cylindrical cavity 15 included in the pump-flowmeter body 17 may be a circle or ellipse or other geometry comprising a continuous closed curve. The cylindrical cavity 15 includes a first fluid passage 18 disposed through the cylindrical wall of the cylindrical cavity 15 on the first half side thereof divided by a plane simultaneously including the central axis of the flap assembly 10 and that of the cylindrical cavity 15, wherein the fluid passage 18 converges to a first port 19. The second fluid passage 20 open to the cylindrical cavity 15 is disposed through the wall of the cylindrical cavity 15 on the second half side thereof, wherein the second fluid passage 20 converges to a second port 21.

In FIG. 3 there is illustrated another cross section of the pump-flowmeter shown in FIG. 2, which cross section is taken along plane 3-3 as shown in FIG. 2. The flaps of the flap assembly 10 are pivotably supported by a plurality of the journals 11, 12, 13, 14, etc., which extend from a first flange 22 and terminate at a second flange 23, which flanges are coaxially affixed to a shaft 24 rotatably supported by a pair of bearings 25 and 26 respectively equipped with seals 27 and 28. The pump version of the pump-flowmeter must have one extremity 29 of the shaft 24 extending out of the body 17, whereby the power from a drive motor or engine is transmitted to the rotating flap assembly through the shaft 24. The flowmeter version of the pump-flowmeter must include a means such as a magnetic target 30 affixed to one end of the shaft 24 and magnetic transducer 31 for measuring the rotational speed of the flap assembly, from which the time rate of fluid flow through the flowmeter is determined. Since the means for transmitting power to the pump or the transducer means for detecting the rotational speed of the flap assembly of the flowmeter is a well known matter of design, structural features related to these functions will be omitted in the other figures illustrating different embodiments of the pump-flowmeter.

The operating principles of the pump-flowmeter illustrated in FIGS. 2 and 3 are straightforward. The flap assembly opens up when it rotates by the second fluid passage 20 and closes down when it rotates by the fluid passage 18. The flap assembly rotating in the clockwise direction takes in fluid through the fluid passage 20 and expells the fluid through the fluid passage 18. The fluid flowing through pump-flowmeter from the fluid passage 18 to the fluid passage 20 rotates the flap assembly in the counter-clockwise direction at a speed substantially proportional to the volume rate of the fluid flow. Although the preferred direction of rotation of the flap assembly shown in FIG. 2 as a pump is the clockwise direction, the counter-clockwise rotation thereof also generates a pumping action as the centrifugal force of the individual flaps open up the flap assembly as it rotates by the fluid passage 18, while the wall of the cylindrical cavity closes down the flap assembly as it rotates by the fluid passage 20. Consequently, in this mode of operation as a pump, the flap assembly rotating in the counter-clockwise direction pumps fluid from the fluid passage 18 to the fluid passage 20. It should be understood that the first and second fluid passages 18 and 20 must be separated from one another by two diametrically oppositely located solid portions of the cylindrical wall of the cylindrical cavity 15 wherein the circumferential width of the solid portions of the cylindrical wall is wide enough whereby at least one flap is under a sliding contact with each of the two solid portions of the cylindrical wall at all instances and thus provides a pressure barrier intermediate the first fluid passage 18 and the second fluid passage 20. The pump-flowmeter shown in FIGS. 2 and 3 has fluid passages disposed through the cylindrical wall of the cylindrical cavity and, consequently, it is called a side-port pump-flowmeter.

In FIG. 4 there is shown an end view of a pump-flowmeter with fluid passages disposed through the end wall of the cylindrical cavity. Consequently, this type of pump-flowmeter is called an end-port pump-flowmeter. The end-port pump-flowmeter comprises a flap assembly 32 eccentrically disposed within a cylindrical cavity 33 in the same arrangement as that described in conjunction with FIGS. 1 and 2. The first fluid passage 34 is disposed through an end wall 35 in the first half side divided by a plane simultaneously including the central axis 36 of the flap assembly and the central axis 37 of the cylindrical cavity 33. The second fluid passage 38 is disposed through the end wall 35 of the cylindrical cavity 33. The first and second fluid passages 34 and 38 are shaped in such a way that the two flow passages are separated by at least one flap under sliding contact with the end wall 35 at all instances, while the two flow passages are provided with the maximum opening area.

In FIG. 5 there is illustrates a cross section of the end-port pump-flowmeter shown in FIG. 4, which cross section is taken along plane 5—5 as shown in FIG. 4. One of the two flanges 39 and 40 supporting the journals pivotably engaged by the flaps, that is disposed adjacent to the end wall 41 including the two fluid passages 34 and 38, has a reduced diameter to provide a sufficient unobstructed area for the end wall 41, through which the two fluid passages are disposed. The two fluid passages 34 and 38 are respectively open to the first port 42 and second port 43. It is clear that, instead of disposing both of the two fluid ports through one end wall 41 of the cylindrical cavity 33 as shown in the particular embodiment of FIGS. 4 and 5, the first fluid passage is disposed through the first end wall while the second fluid passage is disposed through the second end wall opposite to the first end wall, which arrangement is particularly advantageous for the construction of a multi-stage pump comprising two or more pumps arranged in series in an end-to-end configuration and driven by a common shaft. It should be mentioned that the journals pivotably supporting the flaps may be secured to one flange instead of the two flanges as illustrated in FIG. 8.

In FIG. 6 there is illustrated a few different matters of design employed in the construction of flaps. The flap 44 has a solid construction. The flap 45 has a hollow construction wherein the journal bearing hole 46 is connected to the structure of the crescent tear drop shape by a plurality of webs. The flap 47 has a solid construction wherein the central portion of the end faces thereof is recessed. The flap 48 has a solid round first edge and a hollow crescent second edge wherein the mass distribution is balanced about the pivoting axis 49 of the flap. The flap 50 has a magnet 51 imbedded in the crescent tip of the flap, which enhances a sliding contact thereof with the wall of the cylindrical cavity even when the rotating speed of the flap assembly is very low. The flap 52 has a rounded tip of the crescent second edge, which provides improved wear characteristics for the flap.

In FIG. 7 there is illustrated Yin-Yang laps with rounded edge 53 and ball corner 54 wherein a common radius is employed for the rounded edge 53 and the ball corner 54.

In FIG. 8 there is illustrated a cross section of a pump-flowmeter comprising flaps with rounded edges and ball corners as shown in FIG. 7. The corners 55 and 56 of the cylindrical cavity 57 are rounded to match the rounded edges and ball corners of the flap. In this particular embodiment, the journals pivotably holding the flaps are rigidly extending from a single flange 58 affixed to the shaft 59, which arrangement provides an unobstructed end wall 60 and allow flexibility for disposing the two end-ports 61 and 62.

In FIG. 9 there is illustrated a few examples of modified flaps. The flap 63 incldues a planar seal 64 snapped into a seal groove included in the two end faces and the side surface of the flap. The tip 65 of the planar seal 64 is supported by an enlarged tip 66 of the crescent second edge of the flap. The round first edge of the adjacent flap includes a recession to accomodate the combination of the enlarged tip 66 and the tip 65 of the planar seal 64. The flap 67 has a thickened tip 68 of the crescent second edge thereof, that provides improved strength and wear characteristics for the flap. Of course, the first round edge of the adjacent Yin-Yang blade has a recess to accomodate the thickened tip 68 of the flap. The flap 69 includes a reinforced tip 70 of the crescent second edge wherein the tip 70 is reinforced in the form of a round bar. The round first edge of the adjacent blade includes a recess accomodating the reinforced edge 70 of the flap. The flap 71 has a roller bar 72 rotatably retained in a retaining groove disposed in the enlarged tip of the crescent second edge of the flap. Of course, the round first edge of the adjacent flap must have a recess to accomodate the tip of the flap with the roller 72. There is a discontinuity or imperfection in the outer perimeter of the flap assembly, which discontinuity or imperfection extends over a circumference $\alpha$, because of the modified tip of the crescent edge of the flap and the recess included in the round edge of the adjacent flap. The adverse effect of such discontinuities or imperfections in the perimeter of the flap assembly can be easily eliminated by an incorporation of a simple geometry into the cross section of the cylindrical cavity housing the flap assembly as shown in FIG. 10.

Figure 10:
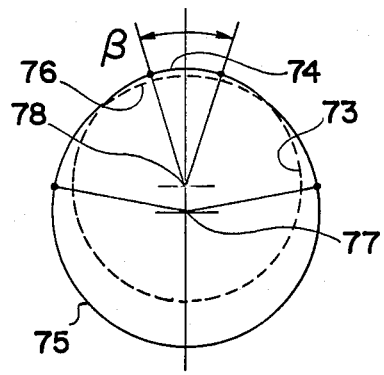
FIG. 10 illustrates cross section geometry of a cylindrical cavity of the pump-flowmeter particularly suitable for housing the assembly of modified flaps such as those shown in FIG. 9.

In FIG. 10 there is illustrated a cross section of the cylindrical cavity that is specifically designed to house the flap assembly with circumferential discontinuities or imperfections as shown in FIG. 9. This cross section of the cylindrical cavity is made of the combination of two circles wherein the shape of the cross section over a circumference $\beta$ coincides with a circle 73 having the same diameter as that of the flap assembly. This portion 74 of the cylindrical cavity wall coinciding with the smaller circle 73 blends smoothly with the other portion 75 of the cylindrical cavity wall coinciding with the larger circle 76. The flap rotating in the cylindrical cavity is under a surface-contact with the cylindrical cavity wall over the circumference $\beta$, while it is under a line-contact over the rest of the circumference of the cylindrical cavity wall. As a consequence, the two halves of the cylindrical cavity divided by a plane simultaneously including the axis 77 of the larger diameter circular cylindrical surface 75 and the axis 78 of the smaller diameter circular cylindrical surface 74 remains isolated from one another as long as the circumference $\beta$ is greater than the circumference $\alpha$ shown in FIG. 9.

Figure 11:
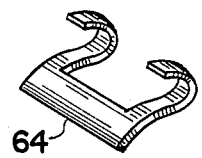
FIG. 11 illustrates an embodiment of the seal usable in conjunction with one of the modified flaps shown in FIG. 9.

In FIG. 11 there is illustrated a perspective view of the seal 64 that snaps into a seal groove included in the flap 63 as shown in FIG. 9.

Figure 12:
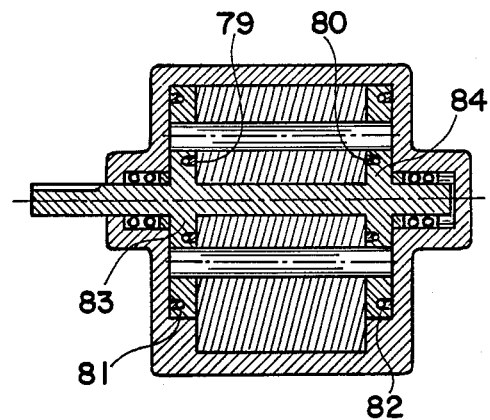
FIG. 12 illustrates a cross section of a pump-flowmeter employing annular seals.

In FIG. 12 there is illustrated a cross section of a pump-flowmeter including metallic ring seals 79, 80, 81 and 82 respectively backed up with a plurality of resilient back-up rings, each of which combinations is confined in an annular seal groove included in the flanges 83 and 84, which support the journals pivotably holding the flaps.

Figure 13:
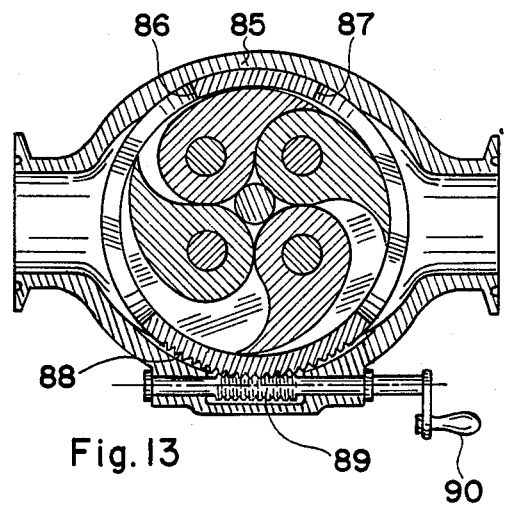
FIG. 13 illustrates an embodiment of the pump-flowmeter including means for varying the flow rates.
Figure 14:
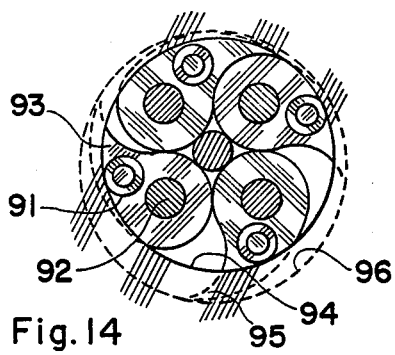
FIG. 14 illustrates a cross section of a pivoting flap pump-flowmeter including cam followers which reduce the sliding friction of the flap tips.

In FIG. 13 there is illustrated a cross section of a pump including means for controlling the flow rate of the fluid being pumped, which means comprises a rotatable shell 85 including the two fluid passages 86 and 87 disposed through two diametrically opposite portions thereof. The outer cylindrical surface of the rotatable shell 85 includes gear teeth 88 engaged by a worm gear 89 with rotating means 90. When the rotatable shell 85 is positioned at the optimum position, the intake side half and the discharge side half of the cylindrical cavity are fully isolated from one another. As the rotatable shell 85 is rotated away from the aforementioned optimum position, the two halves of the cylindrical cavity becomes partially open to one another and, consequently, the pumping rate of the fluid changes as a function of the amount of rotation of the rotatable shell 85. In FIG. 14 there is illustrated a cross section of a pump-flowmeter including cam followers which reduce the sliding friction of the flap tips by reducing the contact pressure between the tips of the flaps and the wall surface of the cavity housing the flap assembly without actually providing a gap therebetween or by actually providing a small gap therebetween. Each of the flaps includes at least one cam follower 91 disposed on the end face of the flap intermediate the pivoting journal 92 and the crescent tip 93. The cam followers anchored to the end faces of the flaps follow an annular cam guide 94 that limits the deflection of the flap to an amount providing a narrow gap between the crescent tip 95 of the flap and the cylindrical wall 96 of the cylindrical cavity.

Figure 15:
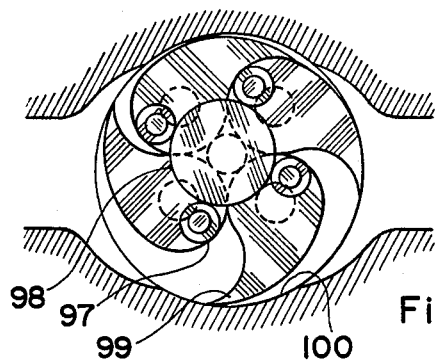
FIG. 15 illustrates a cross section of another pivoting flap pump-flowmeter including cam followers which reduce the sliding friction of the flap tips.

In FIG. 15 there is illustrated a cross section of another pump-flowmeter including cam followers which reduce the sliding friction of the flap tips. Each of the flaps includes at least one cam follower 97 disposed on the end face of the flap adjacent to the round edge thereof and off-set from the pivoting axis. The cam followers anchored to the end face of the flaps follow a circular or near-circular cam guide 98, which combination provides a reduction of the friction between the tips of the flaps and the wall surface of the cavity by merely reducing the contact pressure therebetween without actually providing a gap therebetween or by actually providing a small clearance between the crescent tip 99 of the flap and the cylindrical wall 100 of the cylindrical cavity.

Figure 16:
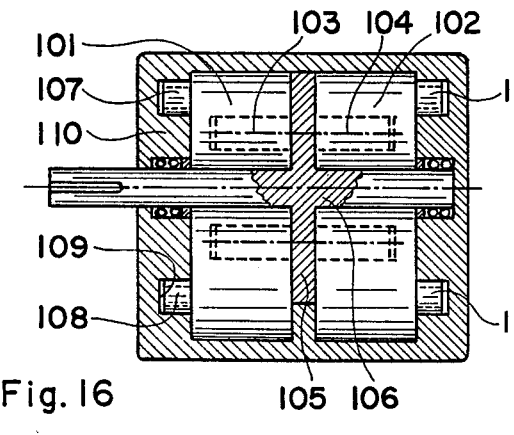
FIG. 16 illustrates a cross section of a pivoting flap pump-flowmeter comprising flaps with cam followers.

In FIG. 16 there is illustrated a cross section of an embodiment of the pump-flowmeter comprising flaps with cam followers such as those illustrated in FIG. 14 or 15. Two sets of the flap assemblies 101 and 102 are supported respectively by two sets of cantilever journals 103 and 104 extending from a common flange 105 in two opposite directions, which flange is rigidly affixed to a shaft 106 in a coaxial arrangement. The cam followers 107, 108, etc, included in the first flap assembly 101 are anchored to the end faces of the flaps opposite the end face thereof adjacent to the flange 105, wherein the cam followers 107, 108, etc. follow the cam groove or cam guide 109 included in the end wall 110 of the cylindrical cavity. The cam followers 111, 112, etc. included in the second flap assembly 102 are arranged in a mirror image to those included in the first flap assembly. It should be understood that the cam follower arrangements such as those illustrated in FIG. 14 or 15 can be readily incorporated into the embodiments of the pump-flowmeters such as those shown in FIGS. 3 and 4 wherein the cam followers are installed on both ends of the flap assembly. In such arrangements the cam followers may be disposed beyond the perimeter of the flange supporting the flap journals or may extend through slotted holes included in the flange and engage the cam guide or cam groove included in the end wall of the cylindrical cavity. The embodiment shown in FIG. 16 provides an advantage for the construction of a pump-flowmeter of a small size wherein the limited space available for the installation of the cam followers is a problem.

Figure 17:
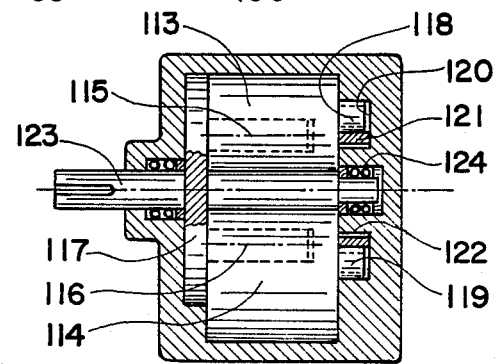
FIG. 17 illustrates a cross section of another pivoting flap pump-flowmeter comprising flaps with cam followers.

In FIG. 17 there is illustrated a cross section of another embodiment of pump-flowmeter comprising flaps equipped with cam followers shown in FIGS. 14 or 15. This combination comprising one half of the combination shown in FIG. 16 is particularly suitable for the incorporation of the type of cam followers shown in FIG. 15. The flaps 112, 113, etc. supported by the cantilever journals 115, 116, etc. rigidly extending from the flange 117 respectively include cam followers 118, 119, etc, anchored to the end faces thereof opposite to the flange 117. In order to accomodate cam groove or cam guide 120 with rotating race 121 rotating on the ball or roller bearings 122, one extremity of the shaft 123 is reduced in diameter and engages a bearing 124 of reduced size.

Figure 18:
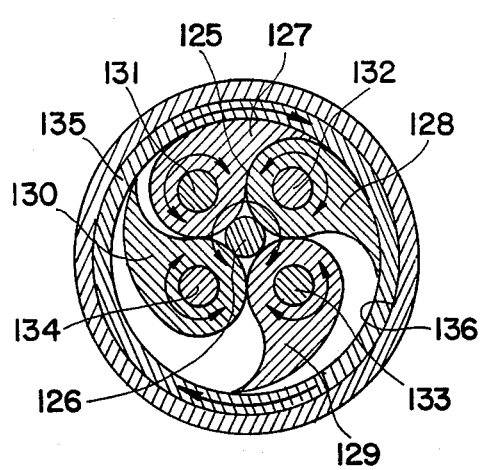
FIG. 18 illustrates a cross section of an embodiment of a pivoting flap pump-flowmeter including a rotating shell housing the flaps.

In FIG. 18 there is illustrated a cross section of a pump-flowmeter including a rotating shell housing the flap assembly, which combination provides another means for reducing the sliding friction of the flap tip in addition to the incorporation of the cam followers as shown in FIGS. 14 and 15. The flap assembly 125 rotating with the shaft 126, which includes a plurality of flaps 127, 128, 129, 130, etc. respectively pivotable about the journals 131, 132, 133, 134, etc., is disposed within a rotating shell 135 in an eccentric arrangement, wherein the rotating shell 135 is rotatably disposed within the cylindrical cavity 136 in a concentric arrangement. The rotating shell 135 may be driven by the rotating motion of the shaft 126 in a nonslipping relationship or it may be driven by the friction from the flap tips in a slipping relationship.

Figure 19:
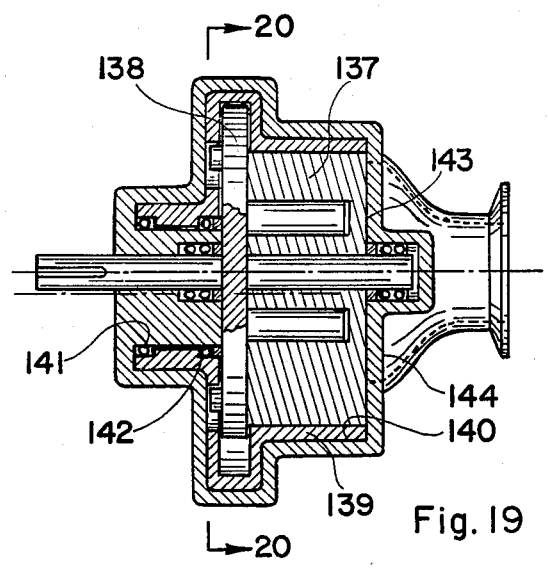
FIG. 19 illustrates another cross section of the pivoting flap pump-flowmeter with the rotating shell.

In FIG. 19 there is illustrated a cross section of a pump-flowmeter with end-ports equipped with a rotating shell, which operates on the same principles as those described in conjunction with FIGS. 4 and 5. The flap assembly 137 pivotably supported by the cantilever journals rigidly extending from the flange 138 is rotatably disposed within a rotating shell 139 in an eccentric arrangement. The rotating shell 139 is rotatably disposed within the cylindrical cavity 140 in a concentric arrangement, wherein the clearance between the wall of the cylindrical cavity 140 and the rotating shell 139 is kept to the minimum in order to check the fluid flow therethrough. The rotating shell 139 is rotatably supported by the bearings 140 and 141 disposed at one extremity thereof adjacent to the flange 138, which arrangement provides an unobstructed end face 143 of the flap assembly that allows the incorporation of the end-ports through the end wall 144 as shown in FIG. 4.

Figure 20:
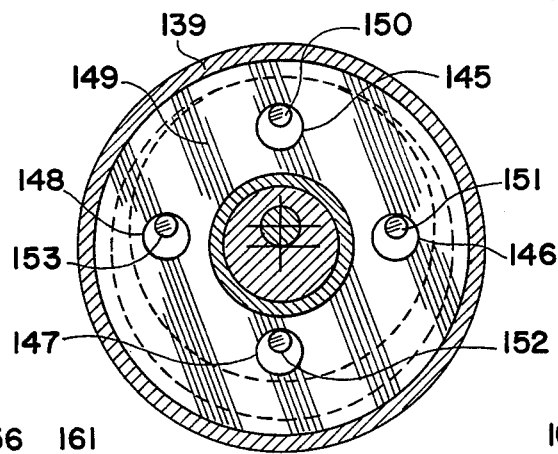
FIG. 20 illustrates a further cross section of the pivoting flap pump-flowmeter with rotating shell shown in FIG. 19.

In FIG. 20 there is illustrated another cross section of the pump-flowmeter shown in FIG. 19, which cross section is taken along plane 20-20 as shown in FIG. 19. The combination of the over-sized circular holes 145, 146, 147, 148, etc. disposed through the end plate 149 rigidly connected to the rotating shell 139 in an axisymmetric pattern about the central axis of the rotating shell and the plurality of the under-sized circular posts 150, 151, 152, 153, etc. rigidly extending from the flange 138 in a axisymmetric pattern about the center of the flange and respectively engaging the over-sized circular holes 145, 146, 147, 148, etc., provides an epicycloid drive, wherein the rotating motion of the flange 138 drives the rotating shell 139 at the same rate of rotation thereof. It should be understood that, in the particular embodiment of the pump-flowmeter shown in FIG. 19, the rotating shell 139 need not rotate at the same rate of rotation as the flap assembly. Therefore, the particular embodiment shown in FIG. 19 works without the epicycloid drive shown in FIG. 20. In such a case, the rotating shell 139 is driven by the friction from the tips of the flaps sliding on the inner cylindrical surface of the rotating shell 139.

Figure 21:
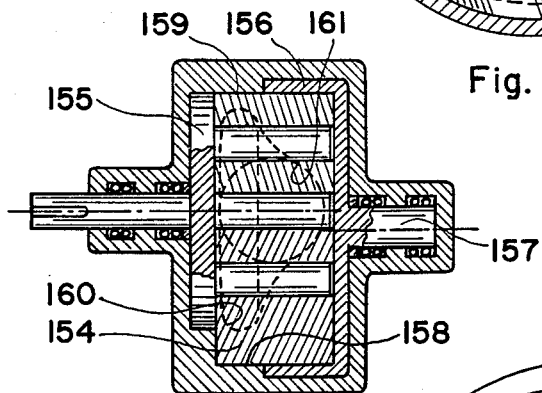
FIG. 21 illustrates a cross section of another embodiment of a pivoting flap pump-flowmeter with rotating shell.

In FIG. 21 there is illustrated a cross section of another pump-flowmeter with side-ports equipped with a rotating shell. The flap assembly 154 supported by the cantilever journals rigidly extending from the flange 155 partially extends into a rotating shell 156 in an eccentric relationship as described in conjunction with FIG. 18. As the rotating shell 156 with one closed end rotatably supported by the rotating shell shaft 157 covers the side wall of the cylindrical cavity 158, the portion of the side wall 159 is directly exposed to the peripheral side of the flap assembly 154. The side ports as represented by the fluid passage 160 that converges to a port 161, are disposed through the portion 159 of the side wall of the cylindrical cavity 158 that is exposed to the flap assembly. The detail of the arrangement of such side-ports is illustrated in FIG. 2. In this particular embodiment shown in FIG. 21, the rotating shell 156 is driven by the friction from the rotating flap assembly.

Figure 22:
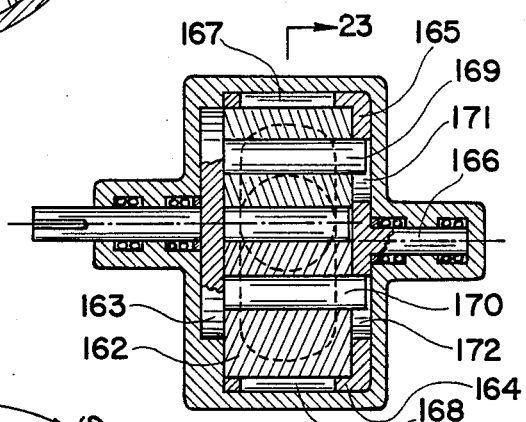
FIG. 22 illustrates a cross section of a further embodiment of a pivoting flap pump-flowmeter with rotating shell.

The rotating shell 156 may be driven positively by the epicycloid drive that links the rotating motion of the flap assembly to that of the rotating shell as shown in FIG. 22.

In FIG. 22 there is illustrated a cross section of a further pump-flowmeter with side ports including a fully extending rotating shell. The flap assembly 162 supported by the cantilever journals rigidly extending from the flange 163 is fully confined within the rotating shell 164 with a closed end 165 that is affixed to the rotating shell shaft 166 in a concentric arrangement. The cylindrical wall of the rotating shell 164 includes a plurality of fluid passages 167, 168, etc. disposed therethrough. The extended extremities 169, 170, etc. of the journals supporting the flaps, which engage holes 171, 172, etc. disposed through the end plates 165 of the rotating shell drives the rotating shell at the same rate of the rotation as that of the flap assembly by means of the epicycloid drive illustrated in FIG. 20. Of course, the positive drive linking the rotating motions of the flap assembly and the rotating shell to one another can be other means than epicycloid drive, which means may be gear, chain and sprocket, timing belt drive, etc.

Figure 23:
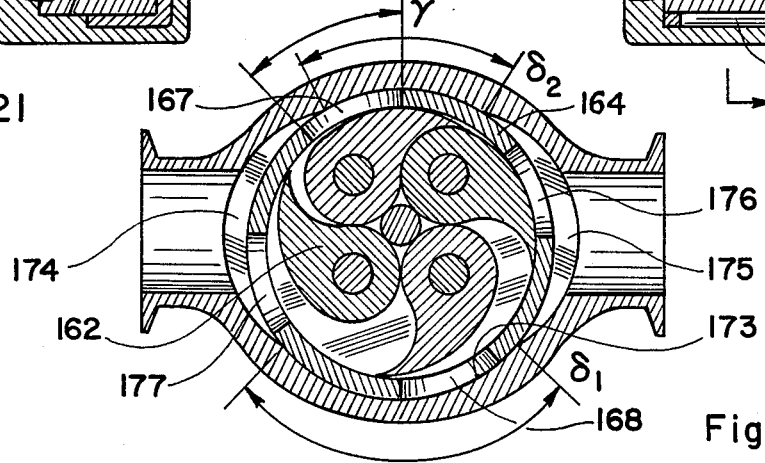
FIG. 23 illustrates another cross section of the pivoting flap pump-flowmeter with rotating shell shown in FIG. 22.

In FIG. 23 there is illustrated another cross section of the pump-flowmeter shown in FIG. 22, which cross section is taken along plane 23—23 as shown in FIG. 22. The combination of the rotating shell 164 and the flap assembly 162 is disposed within the cylindrical cavity 173, which includes the two fluid passage-side port combinations 174 and 175 disposed in an arrangement similar to the corresponding elements included in FIG. 2. In general, the circumference length or angle $\delta$, and $\delta$ separating the two fluid passages 174 and 175 must be greater than the circumference length or angle $\gamma$ of the fluid passages 167, 168, 176, 177, etc. to prevent fluid leak back from the high pressure side to the lower pressure side of the cyindrical cavity 173.

Figure 24:
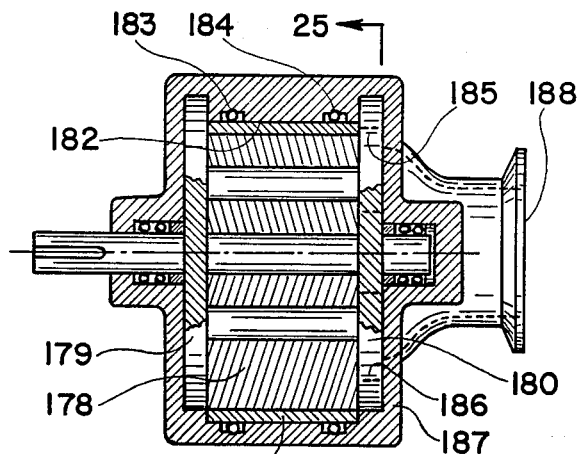
FIG. 24 illustrates a cross section of yet another embodiment of a pivoting flap pump-flowmeter with rotating shell.

In FIG. 24 there is illustrated a cross section of yet another pump equipped with rotating shell. The flap assembly 178 supported by the journals affixed to the two flanges 179 and 180 at both extremities thereof is rotatably disposed within a rotating shell 181 in an eccentric arrangement. The rotating shell 181 is disposed within the cylindrical cavity 182 in a concentric arrangement wherein the rotating shell is rotatably supported by the frictionless bearings 183 and 184. One of the two flanges 180 includes a plurality of fluid passages 185, etc. disposed therethrough in a rotationally symmetric pattern about the center thereof, which fluid passages are intermittently open to the fluid passages 186, etc. disposed through one end wall 187 of the cylindrical cavity 182 and converging to the side ports 188, etc.

Figure 25:
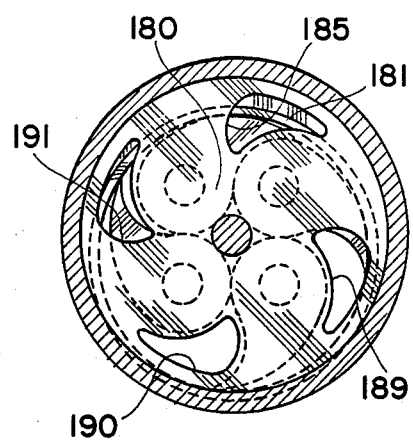
FIG. 25 illustrates another cross section of the pivoting flap pump-flowmeter with rotating shell shown in FIG. 24.

In FIG. 25 there is illustrated another cross section of the pump-flowmeter shown in FIG. 24, which cross section is taken along plane 25-25 as shown in FIG. 24. The flow passages 185, 189, 190, 191, etc. disposed through the flange 180 are arranged in a rotationally symmetric pattern in such a shape and size that the fluid passages 190 and 191 positioned in the high pressure side half of the cylindrical cavity are separated from the fluid passages 185 and 189 positioned in the low pressure side half of the cylindrical cavity by at least one flap.

Figure 26:
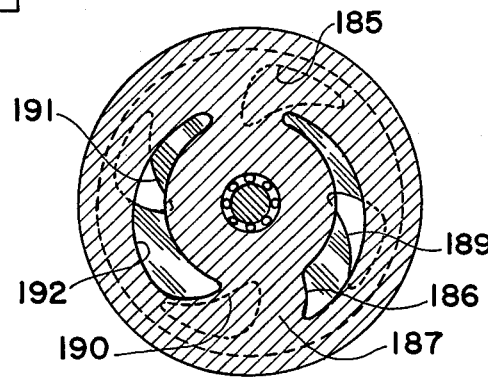
FIG. 26 illustrates a further cross section of the pivoting flap pump-flowmeter with rotating shell shown in FIG. 24.

In FIG. 26 there is illustrated a further cross section of the pump-flowmeter shown in FIG. 25, which cross section is taken along a plane parallel to plane 25—25 shown in FIG. 24 and passing through the end plate 187. The fluid passages 186 and 192 are respectively disposed in two halves of the end wall 187 of the cylindrical cavity 182, which two halves are separated by a plane simultaneously including the central axis of the flanges 179 and 180 and the central axis of the cylindrical cavity 182. The two fluid passages 186 and 192 are separated in such a way that none of the fluid passages 185, 189, 190 and 191 disposed through the flange 180 can be open to both of the fluid passages 190 and 191 disposed through the end wall 187 at any given instance. The embodiment of the pump-flowmeter shown in FIGS. 24, 25, and 26 can be easily modified to dispose the first fluid passage 192 through one end wall of the cylindrical cavity and the second fluid passage 186 through the other end wall, wherein both of the flanges 179 and 180 must have fluid passage holes such as those disposed through the flange 180. It is not difficult to realize that the pumping rate can be controlled by making the end wall 187 rotatable relative to the two fluid passages including fluid passage 188.

Figure 27:
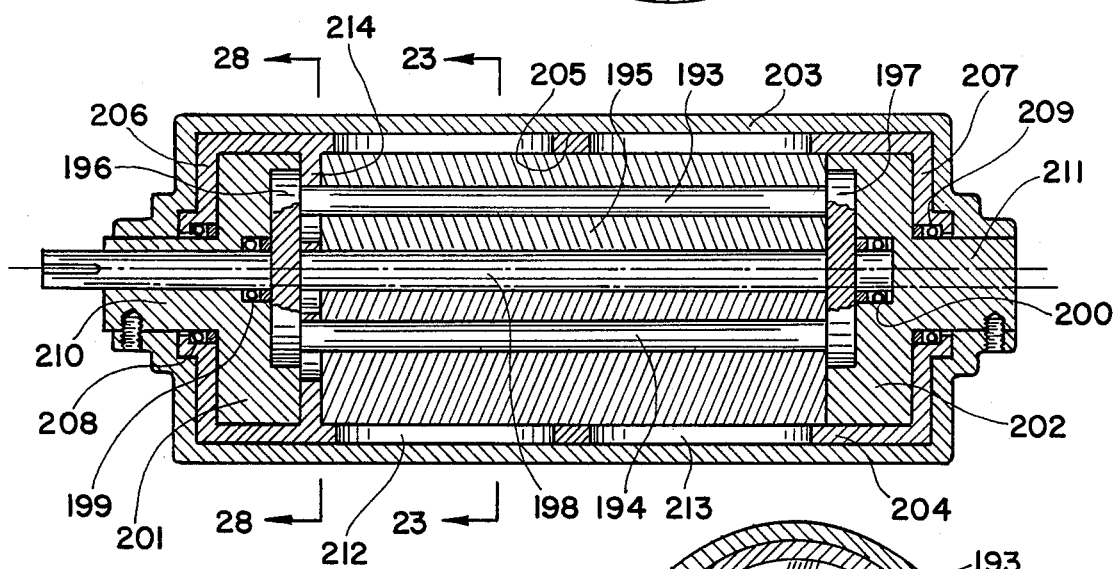
FIG. 27 illustrates a cross section of a pivoting flap pump-flowmeter designed for heavy duty applications.

In FIG. 27 there is illustrated a cross section of a pump-flowmeter designed for heavy duty applications. The plurality of journals 193, 194, etc. supporting the flap assembly 195 are secured to the two rotating flanges 196 and 197 at both extremities thereof, wherein the two rotating flanges 196 and 197 are concentrically affixed to a rotating shaft 198 supported by two frictionless bearings 199 and 200 included in two stationary flanges 201 and 202 in an eccentric arrangement, respectively, which stationary flanges are rigidly secured to the body 203 of the pump-flowmeter. The combination of the flap assembly 195 and flanges 196 and 197 are rotatably disposed within a rotating shell 204 in an eccentric arrangement, that is rotatably disposed within the cylindrical cavity 205 included in the pump-flowmeter body 203. The two end plates 206 and 207 of the rotating shell 204 are rotatably supported by the frictionless bearings 208 and 209, respectively, which bearings are installed on two circular cylindrical extensions 210 and 211 respectively extending from two stationary flanges 201 and 202 and rigidly secured to the pump-flowmeter body 203. The cylindrical shell of the rotating shell 204 includes a plurality of fluid passages 212, 213, etc. disposed in a pattern and shape as shown in FIG. 23 showing the cross section taken along plane 23—23. The rotating shell 204 is driven by the rotating motion of the shaft 198 by means of the epicycloid drive including the drive plate 214 affixed to the rotating shell 204.

Figure 28:
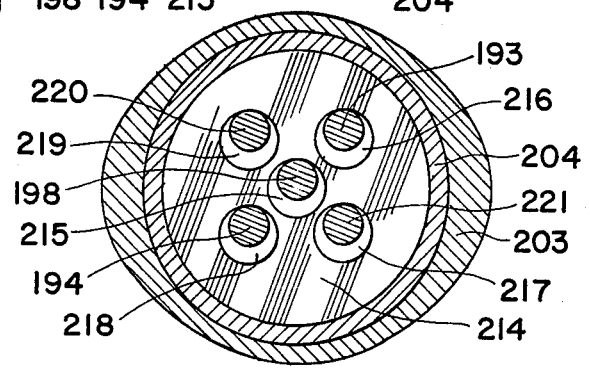
FIG. 28 illustrates another cross section of the heavy duty pivoting flap pump-flowmeter shown in FIG. 27.

In FIG. 28 there is illustrated another cross section of the heavy duty pump-flowmeter shown in FIG. 27, which cross section is taken along plane 28—28 as shown in FIG. 27. The drive plate 214 includes a centrally located over-sized hole 215 that is engaged by the shaft 215 and four over-sized holes 216, 217, 218 and 219 disposed in a axisymmetric pattern about the centrally located over-sized hole 215 and respectively engaged by the journals 193, 221, 194 and 220, which journals pivotably support the flaps included in the flap assembly 195.

It should be understood that the means for controlling the flow rate of the fluid shown in FIG. 13 and/or the arrangements of the cam rollers shown in FIGS. 14 and 15 can be incorporated into the Yin-Yang pump-flowmeters with a rotating shell such as those shown in FIGS. 19, 21, 22, 25 and 27, which incorporation can be accomplished by reasonably simple combination of different arrangements shown in appropriate figures.

While the principles of the present invention have not been made clear by the illustrative embodiments, it will be obvious to those skilled in the art many modifications of the structures, arrangements, proportions, elements and materials which are particularly adapted to the specific working environments and operating conditions in the practice of the invention without departing from those principles.

I claim:

1. An apparatus for pumping and/or measuring fluid flow comprising in combination :

(a) a body including a cylindrical cavity having a smoothly contoured cross section, a first fluid passage open to a first half of the cylindrical cavity; and a second fluid passage open to a second half of the cylindrical cavity opposite to said first half of the cylindrical cavity;

(b) a plurality of flaps with cross section including a generally round first extremity and a crescent second extremity arranged in a generally rotationally symmetric assembly about an axis of rotation in a close relationship between the generally round first extremities of adjacent flaps and disposed within said cylindrical cavity wherein said axis of rotation is parallel to and offset from the central axis of the cylindrical cavity and located on a plane dividing the cylindrical cavity into said first and second halves, and the minimum distance between said axis of rotation and cylindrical wall of the cylindrical cavity is about equal to the radius of a cylindrical surface generally including pheripheral surface of said assembly of flaps folded into an arrangement having a generally circular cross section and the maximum distance between said axis of rotation and cylindrical wall of the cylindrical cavity is less than the sum of the distance between said axis of rotation and the center of curvature of the round first extremity in the cross section of a flap and the distance from said center of curvature to the crescent tip of the flap, said assembly of flaps rotatable about said axis of rotation and each of flaps included in said assembly of flaps pivotable about an axis of pivot coinciding with the center of curvature of the round first extremity in the cross section of said each flap; and (c) means for supporting said assembly of flaps comprising at least one flange rotatable about said axis of rotation and a plurality of journal bearings secured to said flange in an axisymmetric arrangement about said axis of rotation wherein each of said journal bearings supports each of said flaps pivotably about said axis of pivot.

2. The combination as set forth in claim 1 wherein sealing means are disposed intermediate generally round first edges of adjacent flaps.

3. The combination as set forth in claim 1 wherein said combination includes means for measuring the rate of rotation of said assembly of flaps as a measure of fluid flow through said apparatus.

4. The combination as set forth in claim 1 wherein said combination includes means for rotating said flange supporting said assembly of flaps.

5. The combination as set forth in claim 1 wherein said combination includes means for controlling fluid flow through said apparatus by controlling the size of opening of at least one of said first and second fluid passages.

6. The combination as set forth in claim 1 wherein said first fluid passage is disposed through the cylindrical wall of said first half of the cylindrical cavity and said second fluid passage is disposed through the cylindrical wall of said second half of the cylindrical cavity.

7. The combination as set forth in claim 1 wherein said first fluid passage is disposed through a first half of one of the two end walls of the cylindrical cavity adjacent to said first half of the cylindrical cavity and said second fluid passage is disposed through a second half of one of the two end walls of the cylindrical cavity adjacent to said second half of the cylindrical cavity.

8. The combination as set forth in claim 1 wherein each of said flaps includes at least one cam follower secured to one end of the flap in an offset relationship with respect to said axis of pivot and following a closed loop cam guide included in one end wall of the cylindrical cavity, said cam follower reducing contact pressure between the crescent edges of flaps and cylindrical wall of the cylindrical cavity.

9. The combination as set forth in claim 1 wherein the cylindrical cavity includes a cylindrical shell rotatably disposed in the cylindrical cavity wherein the inside surface of said cylindrical shell provides at least a portion of cylindrical wall of the cylindrical cavity under sliding contact with said flaps.

10. The combination as set forth in claim 9 wherein said cylindrical shell is rotated by sliding friction between the flaps and the inside surface of said cylindrical shell.

11. The combination as set forth in claim 9 wherein said cylindrical shell is rotated by a positive drive means coupled to means rotating said assembly of flaps.

12. The combination as set forth in claim 11 wherein said cylindrical shell includes a plurality of fluid passage holes disposed therethrough wherein said fluid passage holes intermittently connects expanding and contracting spaces intermediate the flaps to said first and second fluid passages as said cylindrical shell and said flap assembly rotate at the same rate of revolution.

13. The combination as set forth in claim 1 wherein said at least one flange includes a plurality of fluid passage holes disposed therethrough, wherein said fluid passage holes intermittently connect expanding and contracting spaces intermediate the flaps to said first and second fluid passages as said flange and flap assembly rotate at the same rate of revolution.

14. An apparatus for pumping and/or measuring fluid flow comprising in combination:
(a) a body including a cylindrical cavity having a smoothly contoured cross section, a first fluid passage open to a first half of the cylindrical cavity; and a second fluid passage open to a second half of the cylindrical cavity opposite to said first half of the cylindrical cavity;
(b) two sets of plurality of flaps with cross section including a generally round first extremity and a crescent second extremity, the plurality of flaps included in each of the two sets arranged in a generally rotationally symmetric assembly about an axis of rotation in a close relationship between the generally round first extremities of adjacent flaps and disposed within said cylindrical cavity wherein said axis of rotation is parallel to and offset from the central axis of the cylindrical cavity and located on a plane dividing the cylindrical cavity into said first and second halves, and the minimum distance between said axis of rotation and cylindrical wall of the cylindrical cavity is about equal to the radius of a circular cylindrical surface generally including pheripheral surface of said assembly of flaps folded into an arrangement having a generally circular cross section and the maximum distance between said axis of rotation and the cylindrical wall of the cylindrical cavity is less than the sum of the distance between said axis of rotation and the center of curvature of the round first extremity in the cross section of a flap and the distance from said center of curvature to the crescent tip of the flap, said assembly of flaps rotatable about said axis of rotation and each of flaps included in said assembly of flaps pivotable about an axis of pivot coinciding with the center of curvature of the round first extremity in the cross section of said each flap; and
(c) means for supporting said two sets of flap assembly comprising at least one flange rotatable about said axis of rotation and two sets of plurality of journal bearings disposed at two opposite sides of said flange and secured to said flange in an axisymmetric arrangement about said axis of rotation wherein each of said journal bearing supports each of said flaps pivotably about said axis of pivot.

15. The combination as set forth in claim 14 wherein sealing means are disposed intermediate generally round first edges of adjacent flaps.

16. The combination as set forth in claim 14 wherein said combination includes means for measuring the rate of rotation of said assembly of flaps as a measure of fluid flow through said apparatus.

17. The combination as set forth in claim 14 wherein said combination includes means for rotating said flange supporting said assembly of flaps.

18. The combination as set forth in claim 14 wherein said combination includes means for controlling fluid flow through said apparatus by controlling the size of opening of at least one of said first and second fluid passages.

19. The combination as set forth in claim 14 wherein said first fluid passage is disposed through the cylindrical wall of said first half of the cylindrical cavity and said second fluid passage is disposed through the cylindrical wall of said second half of the cylindrical cavity.

20. The combination as set forth in claim 14 wherein said first fluid passage is disposed through a first half of one of the two end walls of the cylindrical cavity adjacent to said first half of the cylindrical cavity and said second fluid passage is disposed through a second half of one of the two end walls of the cylindrical cavity adjacent to said second half of the cylindrical cavity.

21. The combination as set forth in claim 14 wherein each of said flaps includes at least one cam follower secured to one end of the flap in an offset relationship with respect to said axis of pivot and following a closed loop cam guide included in one end wall of the cylindrical cavity, said cam follower reducing contact pressure between the crescent edges of flaps and cylindrical wall of the cylindrical cavity.

22. The combination as set forth in claim 14 wherein the cylindrical cavity includes a cylindrical shell rotatably disposed in the cylindrical cavity wherein the inside surface of said cylindrical shell provides at least a portion of cylindrical wall of the cylindrical cavity under sliding contact with said flaps.

* * * * *